US011752643B2

(12) United States Patent
Nitz et al.

(10) Patent No.: US 11,752,643 B2
(45) Date of Patent: Sep. 12, 2023

(54) ROBOT HAND GUIDE DEVICE (71) Applicant: KUKA Deutschland GmbH, Augsburg (DE)

(72) Inventors: Gernot Nitz, Gersthofen (DE); Sergiy Ostrovski, Augsburg (DE); Dietmar Tscharnuter, Friedberg (DE)

(73) Assignee: KUKA Deutschland GmbH, Augsburg (DE)

( * ) Notice: Subject to any disclaimer, the term of this patent is extended or adjusted under 35 U.S.C. 154(b) by 430 days.

(21) Appl. No.: 17/280,514

(22) PCT Filed: Sep. 10, 2019

(86) PCT No.: PCT/EP2019/074025
§ 371 (c)(1),
(2) Date: Mar. 26, 2021

(87) PCT Pub. No.: WO2020/064318
PCT Pub. Date: Apr. 2, 2020

(65) Prior Publication Data
US 2022/0040866 A1 Feb. 10, 2022

(30) Foreign Application Priority Data
Sep. 28, 2018 (DE) ...................... 10 2018 216 692.7

(51) Int. Cl.
*B25J 15/00* (2006.01)
*B25J 15/04* (2006.01)
(Continued)

(52) U.S. Cl.
CPC ......... *B25J 15/0408* (2013.01); *B25J 13/085* (2013.01); *B25J 15/0616* (2013.01); *B25J 19/0033* (2013.01)

(58) Field of Classification Search
CPC .. B25J 15/0408; B25J 13/085; B25J 15/0616; B25J 19/0033; B25J 9/0081; G05B 19/423
See application file for complete search history.

(56) References Cited

U.S. PATENT DOCUMENTS 5,063,788 A 11/1991 [Fr]
7,437,954 B2 * 10/2008 Sakano .................. G01L 5/162
73/862.043
(Continued)

FOREIGN PATENT DOCUMENTS

DE 102015200514 B3 6/2016
DE 102017003000 A1 10/2017
(Continued)

OTHER PUBLICATIONS

European Patent Office; Search Report in related International Patent Application No. PCT/EP2019/074025 dated Dec. 2, 2019; 5 pages.
(Continued)

*Primary Examiner* — Victor L MacArthur
(74) *Attorney, Agent, or Firm* — Dorton & Willis, LLP (57) ABSTRACT A robot hand guide device includes a first connection flange configured to connect the robot hand guide device to a tool flange of a robot arm, a second connection flange configured to fasten a tool to be handled by the robot arm to the robot hand guide device, and a transfer apparatus configured to transfer forces and torques between the first connection flange and the second connection flange. A sensor device attached to the transfer apparatus is configured to detect forces and torques transferred via the transfer apparatus. The robot hand guide device further includes at least a first connection element connected to the first connection flange
(Continued)

and configured for detachably connecting a guide handle of the robot hand guide device to the first connection flange.

16 Claims, 5 Drawing Sheets

(51) Int. Cl.
*B25J 13/08* (2006.01)
*B25J 15/06* (2006.01)
*B25J 19/00* (2006.01)

(56) References Cited

U.S. PATENT DOCUMENTS

| | | | | |
|---|---|---|---|---|
| 8,943,902 B2* | 2/2015 | Bosscher | ............... | G01L 1/2281 |
| | | | | 73/862.041 |
| 10,436,654 B2* | 10/2019 | Su | ........................... | G01L 5/162 |
| 2015/0081099 A1 | 3/2015 | [Jp] | | |
| 2017/0285625 A1 | 10/2017 | [Jp] | | |
| 2018/0210434 A1 | 7/2018 | [Jp] | | |
| 2018/0354141 A1 | 12/2018 | [De] | | |

FOREIGN PATENT DOCUMENTS

| | | |
|---|---|---|
| DE | 102016222675 A1 | 5/2018 |
| DE | 102018000467 A1 | 7/2018 |
| EP | D396568 B1 | 1/1992 |
| JP | 102279289 A | 11/1990 |
| JP | 111231925 A | 8/1999 |
| JP | 2012157946 A | 8/2012 |
| WO | 2017060540 A1 | 4/2017 |

OTHER PUBLICATIONS

German Patent Office; Examination Report in related German Patent Application No. 10 2018 216 692.7 dated Jun. 11, 2019; 7 pages.

* cited by examiner

ROBOT HAND GUIDE DEVICE

CROSS-REFERENCE TO RELATED APPLICATIONS

This application is a national phase application under 35 U.S.C. § 371 of International Patent Application No. PCT/EP2019/074025, filed Sep. 10, 2019 (pending), which claims the benefit of priority to German Patent Application No. DE 10 2018 216 692.7, filed Sep. 28, 2018, the disclosures of which are incorporated by reference herein in their entirety.

TECHNICAL FIELD

The invention relates to a robot hand guide device, comprising a first connection flange, which is designed to connect the robot hand guide device to a tool flange of a robot arm, a second connection flange, which is designed to fasten a tool to be handled by the robot arm to the robot hand guide device, a transfer apparatus, which is designed to transfer forces and torques between the first connection flange and the second connection flange and a sensor device attached to the transfer apparatus, said sensor device being designed to detect the forces and torques transferred via the transfer apparatus.

BACKGROUND

DE 10 2015 200 514 B3 describes a force/torque sensor device, comprising a first connection flange with a plurality of flange bores of a first hole pattern, a second connection flange with a plurality of threaded flange bores of a second hole pattern that is aligned with the first hole pattern and at least one deformation region connecting the first connection flange with the second connection flange, which comprises at least one deformation portion, which is connected to an evaluation device, wherein the threaded flange bores of the second connection flange each have a diameter that is larger than the diameter of the respective aligned flange bore of the first connection flange, said diameter being at least large enough so that fastening screws, which, in order to flange the first connection flange, can only be inserted with their threaded shafts into the flange bores of the first connection flange and can pass through the threaded flange threaded bores of the second connection flange even with their screw heads.

SUMMARY

The object of the invention is to create a robot hand guide device with which a robot arm can be manually guided and programmed in a particularly flexible and precisely positioned manner.

This object is achieved, according to the invention, by a robot hand guide device, comprising a first connection flange, which is designed to connect the robot hand guide device to a tool flange of a robot arm, a second connection flange, which is designed to fasten a tool to be handled by the robot arm to the robot hand guide device, a transfer apparatus, which is designed to transfer forces and torques between the first connection flange and the second connection flange and a sensor device attached to the transfer apparatus, said sensor device being designed to detect the forces and torques transferred via the transfer apparatus, wherein the robot hand guide device comprises at least one first connection means, which is connected to the first connection flange, and the at least one first connection means is designed for detachably connecting a guide handle of the robot hand guide device to the first connection flange.

A robot hand guide device is generally used to adjust a robot arm, which can also be controlled automatically by means of a robot controller in another operating mode by means, in particular in accordance with a robot program, so as to be able to adjust the robot arm in the hand guide operating mode by means of a person who is manually guiding the robot arm. A robot hand guide device is used, in particular, to manually move and adjust a tool flange of the robot arm in a space, wherein the individual joints of the robot arm are driven by an electric motor and follow the manually initiated movement of the tool flange. In this regard, the joints of the robot arm are adjusted (semi-) automatically and controlled by the robot controller in conjunction with corresponding drive amplifiers. To make a hand-guided movement of the tool flange manually possible at all, forces and/or torques that a person introduces into the robot hand guide device, for example via a handle of the robot hand guide device, must be recorded with regard to their directions, orientations and/or amounts. This is because the links of the robot arm are not moved, i.e., adjusted by the human force of the guiding person but, as already mentioned, instead by the motors assigned to the links of the robot arm, which are controlled by the robot controller. Consequently, the robot controller needs information about the forces and/or torques that a person applies to the robot hand guide device, for example via a handle on the robot hand guide, with regard to their directions, orientations and/or amounts in order to be able to control the links of the robot arm on their basis in a (semi-) automatic manner.

In order to be able to detect the forces and/or torques applied to the robot hand guide device by a person via the handle in terms of their directions, orientations and/or amounts, the robot hand guide device comprises at least one sensor device which transfers the forces/torques applied to the robot hand guide device via the handle. Such a robot hand guide device or such a sensor device is generally known from DE 10 2015 200 514 B3, for example.

The transfer apparatus according to the present invention can, in this respect, comprise several deformation portions and associated sensors such as strain gauges, as disclosed in DE 10 2015 200 514 B3. The deformation portions are designed accordingly and connect the first connection flange to the second connection flange in such a way that the forces and/or torques that a person applies to the robot hand guide device, for example via a handle of the robot hand guide device, lead to specific deformations, in particular a bending of the deformation portions. These deformations, in particular distortions, are then detected by the deformation sensors, i.e., the sensor devices.

The transfer apparatus can comprise a plurality of deformation portions and each deformation portion can comprise a plurality of deformation sensors.

The sensor device can be designed for a one-dimensional or a multi-dimensional detection of forces and/or torques. The sensor device can, for example, be designed for a six-dimensional detection, in particular for detecting forces in the three Cartesian spatial directions and for detecting torques about the three Cartesian spatial directions.

The one or more deformation portions can be formed by bending portions, in particular web-shaped bending portions, which connect the two connection flanges; in particular, the one or more deformation portions can be designed as one piece with the two connection flanges, in particular from one piece, i.e., made from solid material.

The sensor device can, for example, comprise a plurality of one-dimensional or multi-dimensional strain gauges or strain gauge fields. A single deformation sensor can be, for example, a one-dimensional or multi-dimensional strain gauge or a strain gauge field.

The first connection means can be arranged directly on the first connection flange. However, the first connection means does not have to be attached directly to the first connection flange. Rather, the first connection means can also be arranged on a component of the robot hand guide device that differs from the first connection flange, provided that this component is rigidly connected to the first connection flange. Functionally, the first connection means is to be designed in such a way that forces and/or torques which a person applies to the first connection means by means of the guide handle connected to the first connection means are transferred to the first connection flange in an unchanged, i.e., unaltered manner.

Since the robot hand guide device comprises at least one first connection means which is connected to the first connection flange and the at least one first connection means is designed for detachably connecting a guide handle of the robot hand guide device to the first connection flange, a robot hand guide device is created with which a robot arm can be manually guided and programmed in a particularly flexible and precise manner.

The detachability of the guide handle from the connection flange has several advantages. The guide handle in the basic configuration can be easily detached from the robot hand guide device, which reduces the outer contour of the robot hand guide device when the guide handle is not needed, for example when the robot arm is automatically moved by the robot controller in an automatic mode, according to a robot program, without any manual guidance.

In the further embodiments described in more detail below, further advantages can result due to the detachability of the guide handle. Thus, in the case of a plurality of first connection means or a plurality of second connection means, the guide handle can optionally be attached at different points of the same connection flange, i.e., the first connection flange or the second connection flange. Depending on the location of a person operating the robot relative to the robot arm, for example standing to the right of the robot arm or to the left of the robot arm, the guide handle can be attached to one side of the respective connecting flange or to another, for example, opposite side of the respective connecting flange, depending on where the person is.

In the case of a robot hand guide device with a first connection flange and a second connection flange, the guide handle can optionally be attached to the first connection flange or the second connection flange so that different modes of operation of the robot hand guide device can be configured, depending on the location of the guide handle.

In a special basic embodiment, the robot hand guide device can thus comprise at least one second connection means in addition to the at least one first connection means, which is connected to the second connection flange, wherein the at least one first connection means and the at least one second connection means are designed for an optional detachable connection of a guide handle of the robot hand guide device to the first connection flange or the second connection flange.

The second connection means can be arranged directly on the second connection flange. However, the second connection means does not have to be fastened directly to the second connection flange. Rather, the second connection means can also be arranged on a component of the robot hand guide device that differs from the second connection flange, provided that this component is rigidly connected to the second connection flange. Functionally, the second connection means is to be designed in such a way that forces and/or torques which a person applies to the second connection means by means of the guide handle connected to the second connection means are transferred to the second connection flange in an unchanged, i.e., unaltered manner.

Since the at least one first connection means and the at least one second connection means are designed for the optional detachable connection of a guide handle of the robot hand guide device to the first connection flange or the second connection flange, the forces and/or torques that a person applies to the robot hand guide device can be applied either between the tool flange of the robot and the sensor device of the robot hand guide device or between the sensor device and the tool.

If the guide handle is connected to the robot hand guide device in such a way that the guide handle is arranged between the tool flange of the robot and the sensor device of the robot hand guide device, process forces and/or process torques can be detected by the sensor device when, by moving the robot hand guide device, the robot hand guide device connected to the robot arm is moved together with the robot arm and thus a tool connected to the robot hand guide device is handled. The manual movement of the links of the robot arm can take place, for example, on the basis of the link's torque sensors of the robot arm itself or by evaluating the motor currents of the link motors of the robot arm that are assigned to the respective links of the robot arm.

If the guide handle is connected to the robot hand guide device in such a way that the guide handle is arranged between the sensor device and the tool, the link's movements of the robot arm can be controlled on the basis of the sensor signals from the sensor device in a manually guided operation. In this case, the robot arm itself does not need any corresponding sensors such as link's torque sensors. Without a second sensor device, however, it is not possible to detect the process forces and/or process torques of the tool by means of the robot hand guide device.

If an additional detection of the process forces and/or process torques of the tool is desired, the robot hand guide device, as will be described below, can be provided with a second sensor device so that a manually guided operation by means of the robot hand guide device and a detection of the process forces and/or process torques of the tool can take place at the same time.

The first connection means and the second connection means can each comprise a mechanical coupling device, which are designed for a force-fitting and/or form-fitting mechanical connection of the guide handle with either the respective first connection flange or the second connection flange.

Via the mechanical coupling device, the forces and/or torques that a person applies to the connection means by means of the guide handle connected to the respective connection means are transferred to the associated connection flange in an unchanged, i.e., unaltered manner.

The respective mechanical coupling device of the first connection means and the second connection means can comprise a mechanical safety device which is designed to allow an operation of the guide handle exclusively either on the first connection means or on the second connection means.

The first mechanical coupling device or the plurality of first mechanical coupling devices of the first connection means or the second mechanical coupling device or the plurality of second mechanical coupling devices of the second connection means are identical types of coupling devices. The guide handle comprises a corresponding mating coupling device that is suitable for being plugged into one another.

The mechanical safety device can thus be designed to mechanically block the at least one second connection means when the guide handle is connected to the first connection means so that no further guide handle can be coupled there.

In the case of a plurality of first connection means on the first connection flange, the mechanical safety device can also be designed to mechanically block the further first connection means when the guide handle is connected to one of the plurality of first connection means so that no further guide handle can be coupled to this further first connection means.

Analogously, in the case of a plurality of second connection means on the second connection flange, the mechanical safety device can also be designed to mechanically block the further second connection means when the guide handle is connected to one of the plurality of second connection means so that no further guide handle can be coupled to this further first connection means.

The first connection means and the second connection means can each comprise an electrical contact means which are designed to electrically connect an enabling switch, a confirmation switch and/or an emergency stop switch of the guide handle to an electrical control device when the guide handle is mechanically coupled to the respective first connection flange or the second connection flange.

In this respect, the guide handle can comprise an enabling switch, a confirmation switch and/or an emergency stop switch. The electrical contact means can be, for example, an electrical plug, an electrical socket or an electrical coupling. The guide handle comprises a corresponding electrical mating connection means or electrical mating contact means that is suitable for being plugged into one another. The electrical contact means of the first connection means or of the plurality of first connection means and the electrical contact means of the second connection means or of the plurality of second connection means are identical types of contact means.

The robot hand guide device can comprise a safety control device which is designed to allow an operation of the guide handle exclusively either when mechanically coupled to the first connection means or when mechanically coupled to the second connection means via the respective electrical contact means of the first connection means and the second connection means.

This way, instead of a mechanical device, a safety device can be created in an electronic manner, which prevents two guide handles from being able to be functionally coupled to the robot hand guide device at two different points at the same time. Depending on the orientation of the guide handle relative to the robot hand guide device, i.e., depending on the location of the guide handle on one of the connecting means, the safety control device can also be configured to adapt the sensor devices of the robot hand guide device accordingly, i.e., to calibrate them.

The electrical control device, the safety control device and/or an electronic evaluation unit for the sensor device can be accommodated in the guide handle and/or in the robot hand guide device. The electronic evaluation unit can be designed, for example, to generate signals from the signals of the sensor devices, which, for example in the case of strain gauges, can be a change in the electrical resistance and/or current correlating to the forces and/or torques, and provide them to the robot controller.

The robot hand guide device can comprise a first circumferential outer wall which is connected to the first connection flange and which comprises a plurality of first connection means arranged across the circumferential outer wall.

The robot hand guide device can comprise a second circumferential outer wall which is connected to the second connection flange and which comprises a plurality of second connection means arranged across the circumferential outer wall.

The first connection flange can comprise a first electrical contact group, which is formed with a first mating contact group when the robot hand guide device makes electrical contact with a first mating contact group on the tool flange of the robot arm when mechanically coupled to the tool flange of the robot arm so as to electrically connect the enabling switch, the confirmation switch, the emergency stop switch of the guide handle and/or the first sensor device and/or the second sensor device with the robot arm or its robot controller.

The second connection flange can comprise a second electrical contact group which is designed to make electrical contact with a second mating contact group of the tool when a tool is mechanically coupled to the second connection flange in order to electrically connect the tool with the robot hand guide device and/or with the robotic arm.

The robot hand guide device can comprise an at least substantially cylindrical casing with an at least substantially circular cylindrical outer wall, wherein one circular end face of the casing is formed by the first connection flange and the opposite, other circular end face of the casing being is formed by the second connection flange.

Electrical, hydraulic and/or pneumatic lines can be passed through the interior of the casing. Electronic circuit boards, electronic components and/or electrical contact pins can be arranged in the interior of the casing. The electrical, hydraulic and/or pneumatic lines can be used to feed process means from the interior of the robot arm through the interior of the robot hand guide device to the tool. This means that lines that would otherwise be required outside of the robot hand guide device can be dispensed with. The casing can be made of plastic or metal.

The robot hand guide device can comprise a control device which is configured to evaluate sensor signals of the sensor device when the guide handle is connected to the first connection means of the first connection flange in such a way that process forces and/or process torques are detected on the basis of the sensor signals of the sensor device when, by moving the guide handle, the robot hand guide device connected to a tool flange of a robot arm with its first connection flange is moved together with the robot arm and a tool connected to the second connection flange of the robot hand guide device is handled as a result.

The robot hand guide device can comprise a control device which is configured to evaluate sensor signals of the sensor device when the guide handle is connected to the second connection means of the second connection flange in such a way that a robot arm in a manually guided operation is controlled in its movements on the basis of the sensor signals of the sensor device when, by moving the guide handle, the robot hand guide device connected with its first connection flange to a tool flange of the robot arm is moved together with the robot arm.

In addition to the first connection flange and the second connection flange, the robot hand guide device can comprise a third connection flange, wherein the transfer apparatus arranged between the first connection flange and the second connection flange form a first transfer apparatus to which a first sensor device is fastened, which is designed to detect forces and torques transferred via the first transfer apparatus, and a second transfer apparatus is arranged between the first connection flange and the third connection flange, to which a second sensor device is fastened, which is designed to detect the forces and torques transferred via the second transfer apparatus.

The robot hand guide device can comprise a control device which is configured to evaluate sensor signals of the second sensor device when the guide handle is connected to the first connection means of the first connection flange in such a way that, on the basis of the sensor signals of the second sensor device, a robot arm in a manually guided mode is controlled in its link movements and is configured to evaluate sensor signals of the first sensor device when the guide handle is connected to the first connection means of the first connection flange in such a way that process forces and/or process torques are detected on the basis of the sensor signals of the first sensor device when, by moving the guide handle, the robot hand guide device is moved together with its third connection flange, which causes a tool connected to the second connection flange of the robot hand guide device to be handled.

Specific embodiments of the invention are explained in more detail in the following description with reference to the accompanying figures. Specific features of these embodiments can represent general features of the invention regardless of the specific context in which they are mentioned, possibly also considered individually or in further combinations.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
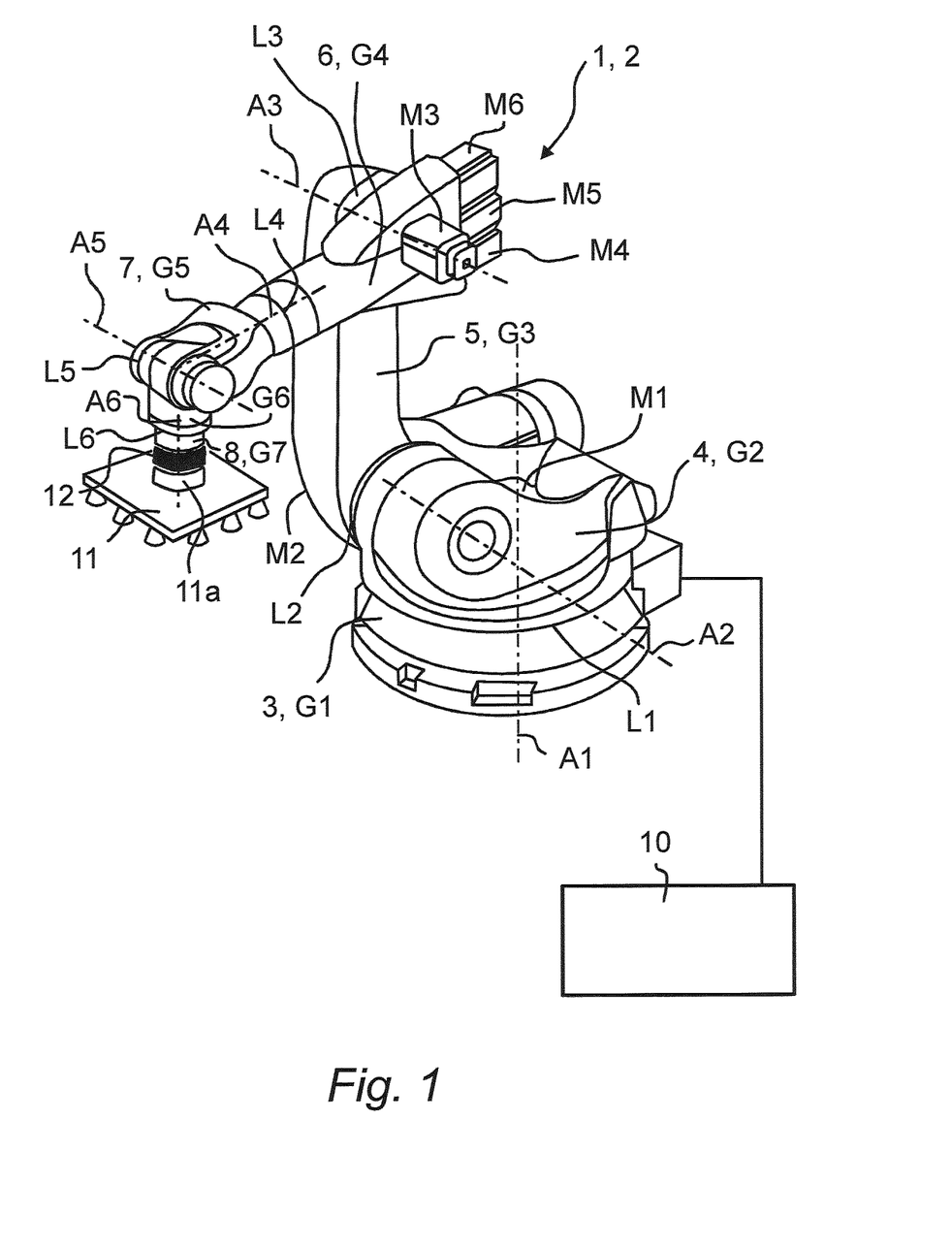
FIG. 1 is a perspective view of an industrial robot that comprises a robot arm and a robot controller as well as a tool and a robot hand guide device according to the principles of the invention.

FIG. 1 is a depiction of an industrial robot 1 which comprises a robot arm 2 and a robot controller 10. In the case of the present exemplary embodiment, the robot arm 2 comprises a plurality of links G1 to G7 which are arranged one after the other and are rotatably connected to one another by means of members L1 to L6.

The industrial robot 1 comprises the robot controller 10, which is designed to execute a robot program, as well as the robot arm 2 with several members G1-G7, which are connected via links L1-L6, which are used to automatically adjust the members G1-G7 against each other according to the robot program, wherein one of the plurality of members G1-G7 forms an end member (G7) of the robot arm 2, which comprises a tool flange 8 with threaded robot flange holes 8.1 to 8.7 and a robot flange fitting hole 8.8, in particular a first hole pattern.

The robot controller 10 of the industrial robot 1 is designed or configured to execute a robot program, by means of which the links L1 to L6 of the robot arm 2 can be automated or automatically adjusted or rotated in a manual mode in accordance with the robot program. For this purpose, the robot controller 10 is connected to controllable electrical drives M1 to M6, which are designed to adjust the links L1 to L6 of the industrial robot 1.

In the case of the present exemplary embodiment, the members G1 to G7 are a frame 3 and a carousel 4 which are rotatably mounted relative to the frame 3 about a vertically extending axis A1. Further elements of the robot arm 2 are a link arm 5, a boom arm 6 and a preferably multi-axis robot hand 7 with a fastening device designed as a tool flange 8 for fastening a tool 11 or a force/torque sensor device 12 according to the invention. The link arm 5 is mounted at the lower end on the carousel 4, i.e., on the link L2 of the link arm 5, which can also be referred to as the pivot bearing head so as to be pivotable about a preferably horizontal axis of rotation A2. In the case of the exemplary embodiment shown, the tool 11 is designed as a suction gripper but is representative of any other type of robot tool. The tool 11 or the suction gripper comprises a fastening flange 11a.

At the upper end of the link arm 5, the boom arm 6 is again mounted on the first link L3 of the link arm 5 so as to be pivotable about a likewise preferably horizontal axis A3. At its end, the boom arm supports the robot hand 7 with its preferably three axes of rotation A4, A5, A6. The links L1 to L6 can each be driven by a robot controller 10 in a program-controlled manner by one of the electrical drives M1 to M6.

The robot arm 2 comprises a robot hand guide device 12 as described below, which is screwed to the tool flange 8 of the robot arm 2 by means of fastening screws via a first connection flange 14.1 of the robot hand guide device 12.

Figure 2:
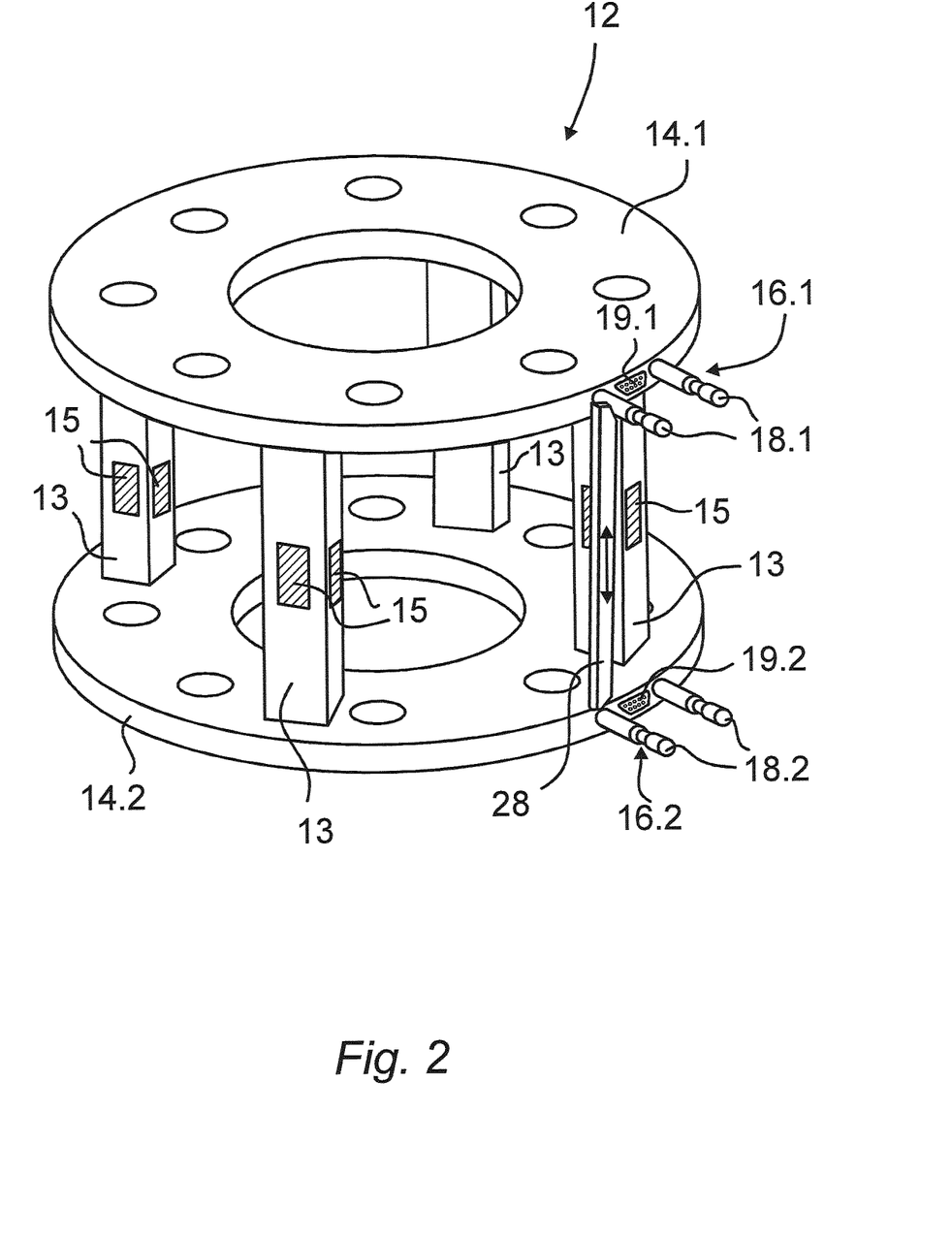
FIG. 2 is a schematic representation of a representative embodiment of a robot hand guide device according to the principles of the invention with the casing removed.

In FIG. 2, the robot hand guide device 12 is shown schematically in its basic embodiment.

The robot hand guide device 12 comprises a first connection flange 14.1, which is designed to connect the robot hand guide device 12 to the tool flange 8 of the robot arm 2. The robot hand guide device 12 also comprises a second connection flange 14.2 which is designed to fasten a tool 11 to be handled by the robot arm 2 to the robot hand guide device 12 as well as a transfer apparatus 13 which is designed to transfer forces and torques between the first connection flange 14.1 and the second connection flange 14.2 and a sensor device 15 attached to the transfer apparatus 13, which is designed to detect the forces and torques transferred via the transfer apparatus 13, wherein the robot hand guide device 12 comprises at least one first connection means 16.1 which is connected to the first connection flange 14.1, and the at least one first connection means 16.1 is designed for detachably connecting a guide handle 17 (FIG. 5) of the robot hand guide device 12 to the first connection flange 14.1. For this purpose, the robot hand guide device 12 comprises a mating connection means 29 which, when connected to the first connection means 16.1 or second connection means 16.2, interacts both mechanically and electrically.

In the embodiment shown in FIG. 2, the robot hand guide device 12 comprises, in addition to the at least one first connection means 16.1, at least one second connection means 16.2, which is connected to the second connection flange 14.2, wherein the at least one first connection means 16.1 and the at least one second connection means 16.2 are designed for the optional detachable connection of the guide handle 17 (FIG. 5) of the robot hand guide device to the first connection flange 14.1 or the second connection flange 14.2.

The first connection means 16.1 and the second connection means 16.2 each comprise a mechanical coupling device 18.1, 18.2, which are designed for the force-fitting and/or form-fitting mechanical connection of the guide handle 17 (FIG. 5) with either the respective first connection flange 14.1 or the second connection flange 14.2.

The respective mechanical coupling device 18.1, 18.2 of the first connection means 16.1 and the second connection means 16.2 can comprise a mechanical safety device 28 (FIG. 2) which is designed to allow an operation of the guide handle 17 (FIG. 5) exclusively either on the first connection means 16.1 or on the second connection means 16.2.

Figure 3:
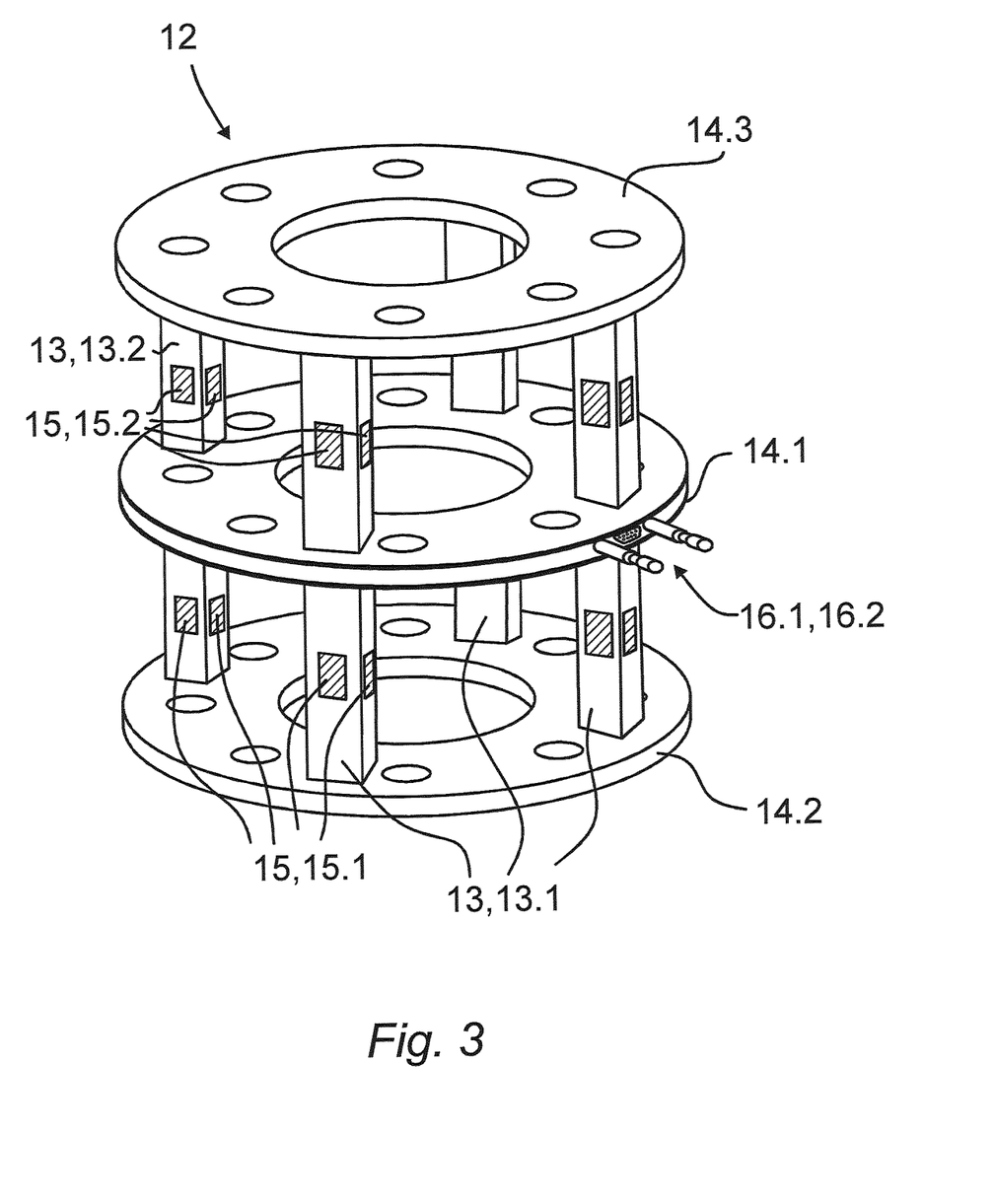
FIG. 3 is a schematic representation of an expanded embodiment of a robot hand guide device according to the principles of the invention with the casing removed.
Figure 4:
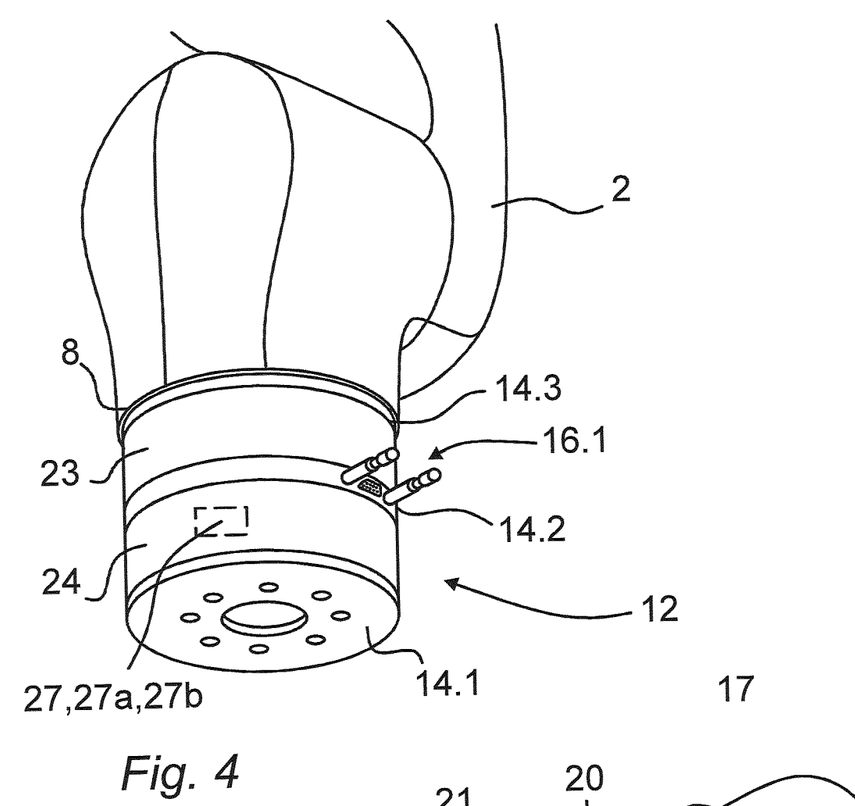
FIG. 4 is a perspective view of a hand portion of a robot arm with a tool flange to which the robot hand guide device according to FIG. 3 is fastened by way of example.
Figure 5:
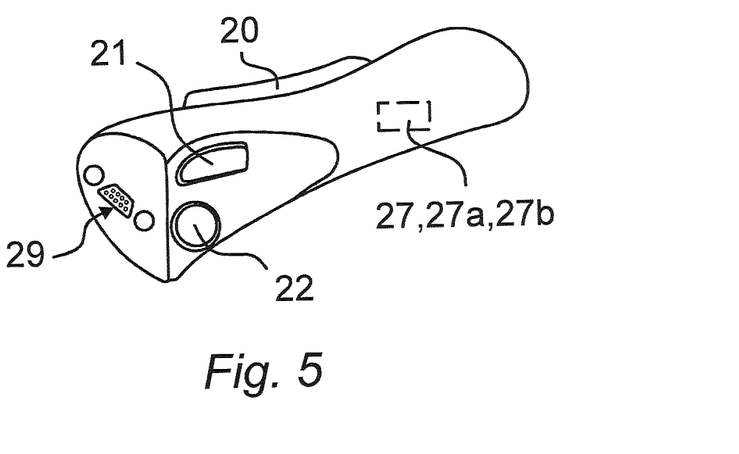
FIG. 5 is a perspective view of an exemplary guide handle that can be detachably attached to the robot hand guide device according to FIG. 4.

In the embodiments according to FIGS. 2 to 6, the first connection means 16.1 and the second connection means 16.2 each also comprise an electrical contact means 19.1, 19.2, which are designed to electrically connect an enabling switch 20, a confirmation switch 21 and/or an emergency stop switch 22 of the guide handle 17, as shown in FIG. 5, to an electrical control device 27 when the guide handle 17 is mechanically coupled to the respective first connection flange 14.1 or second connection flange 14.2.

The robot hand guide device 12 can comprise a safety control device 27a which is designed to allow an operation of the guide handle 17 exclusively either when mechanically coupled to the first connection means 16.1 via the respective electrical contact means 19.1, 19.2 of the first connection means 16.1 and the second connection means 16.2 or when mechanically coupled to the second connection means 16.2.

The electrical control device 27, the safety control device 27a and/or the electronic evaluation unit 27b for the sensor device 15 can be accommodated in the guide handle 17 and/or in the robot hand guide device 12.

Figure 6:
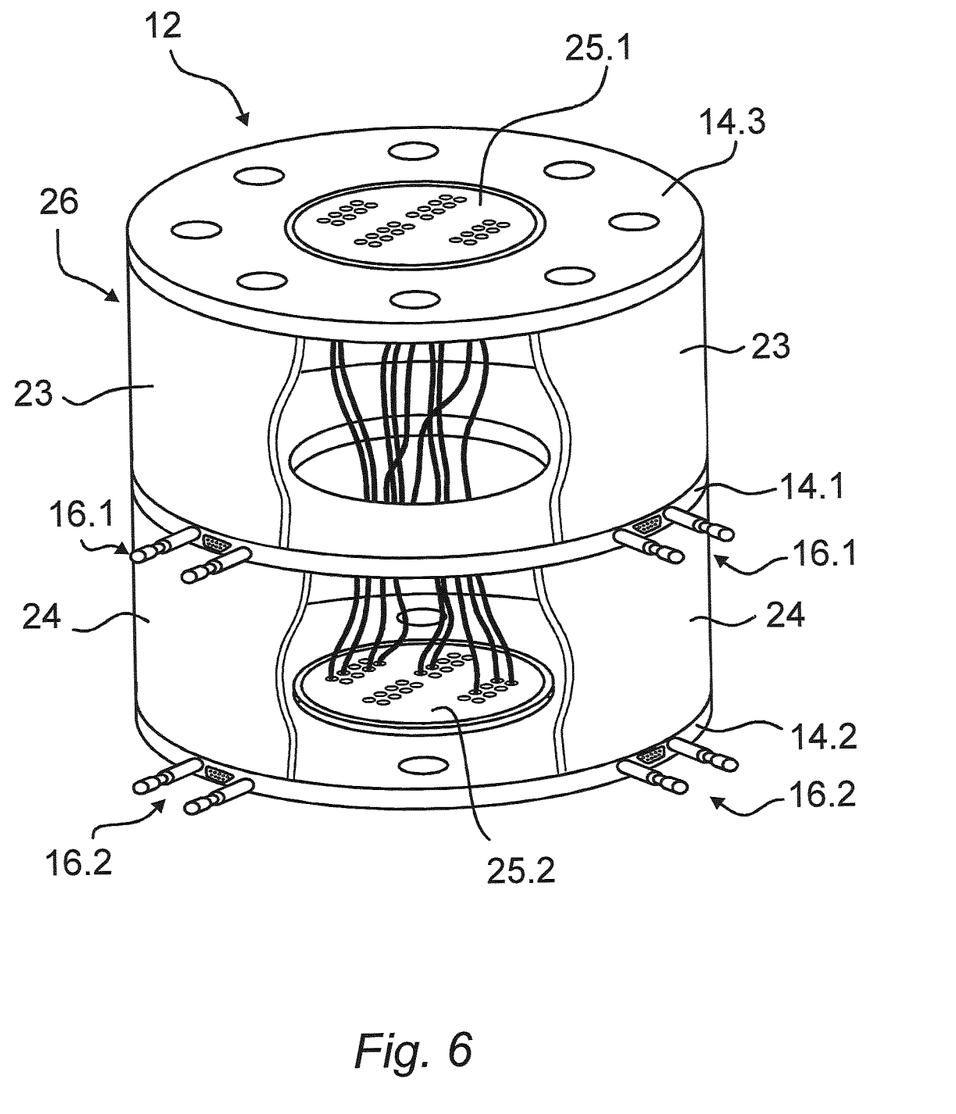
FIG. 6 is a partial sectional view of a representative other example of a robot hand guide device according to the principles of the invention with electrical contact groups.

As shown, in particular in FIGS. 4 and 6, the robot hand guide device 12 comprises a first circumferential outer wall 23 which is connected to the first connection flange 14.1 and which comprises a plurality of first connection means 16.1 arranged across the circumferential outer wall 23.

The robot hand guide device 12 in the alternative embodiment according to FIGS. 4 and 6 also comprises a second circumferential outer wall 24 which is connected to the second connection flange 14.2 and which comprises a plurality of second connection means 16.2 arranged across the circumferential outer wall 24.

In the alternative embodiment shown in FIGS. 4 and 6, the robot hand guide device 12 comprises a third connection flange 14.3 in addition to the first connection flange 14.1 and the second connection flange 14.2, wherein the transfer apparatus 13 arranged between the first connection flange 14.1 and the second connection flange 14.2 forms a first transfer apparatus 13.1 to which a first sensor device 15.1 is attached, which is designed to detect the forces and torques transferred via the first transfer apparatus 13.1 and wherein a second transfer apparatus 13.2 is arranged between the first connection flange 14.1 and the third connection flange 14.3 to which a second sensor device 15.2 is attached, which is designed to detect the forces and torques transferred via the second transfer apparatus 13.2.

The first connection flange 14.1 or, as shown in FIG. 6, the third connection flange 14.3 comprises a first electrical contact group 25.1, which is formed with a first mating contact group when the robot hand guide device 12 makes electrical contact with a first mating contact group on the tool flange 8 of the robot arm 2 when mechanically coupled to the tool flange 8 of the robot arm 2 so as to electrically connect the enabling switch 20, the confirmation switch 21, the emergency stop switch 22 of the guide handle 17 and/or the first sensor device 15.1 and/or the second sensor device 15.2 with the robot arm 2 or its robot controller 10.

The second connection flange 14.2 can accordingly comprise the second electrical contact group 25.2, which is designed to make electrical contact with a second mating contact group of the tool 11 when a tool 11 is mechanically coupled to the second connection flange 14.2 in order to electrically connect the tool 11 and the robot hand guide device 17 and/or with the robot arm 2 or its robot controller 10.

In the case of the present exemplary embodiments, the robot hand guide device 12 comprises an at least substantially cylindrical casing 26 (FIG. 6) with an at least substantially circular cylindrical wall, wherein one circular end face of the casing 26 is formed by the first connecting flange 14.1, and the other opposite circular end face of the casing 26 is formed by the second connection flange 14.2.

The robot hand guide device 12, as shown in FIG. 2, can comprise a control device 27 which is configured to evaluate sensor signals of the sensor device 15, 15.1 when the guide handle 17 is connected to the first connection means 16.1 of the first connection flange 14.1 in such a way that process forces and/or process torques are detected the basis of the sensor signals of the sensor device 15, 15.1 when, by moving the guide handle 17, the robot hand guide device 12 connected to a tool flange 8 of a robot arm 2 with its first connection flange 14.1, is moved together with the robot arm 2, and a tool 11 connected to the second connection flange 14.2 of the robot hand guide device 12 is handled as a result.

The robot hand guide device 12, as shown in FIG. 2, can comprise a control device 27 which is configured to evaluate sensor signals of the sensor device 15, 15.1 when the guide handle 17 is connected to the second connection means 16.2 of the second connection flange 14.2 in such a way that, based on the sensor signals of the sensor device 15, 15.2 a robot arm 2 is controlled in its link movements in a manual operation when, by moving the guide handle 17, the robot hand guide device 17 connected with its first connection flange 14.1 to a tool flange 8 of the robot arm 2 is moved together with the robot arm 2.

The robot hand guide device 12, as shown in FIGS. 3 and 6, can comprise a control device 27 which is configured to evaluate sensor signals from the second sensor device 15.2 when the guide handle 17 is connected to the first connection means 16.1 of the first connection flange 14.1 in such a way that, on the basis of the sensor signals from the second sensor device 15.2, a robot arm 1 is controlled in its link movements in a manual operation and is configured, when the guide handle 17 is connected to the first connection means 16.2 of the first connection flange 14.1, to evaluate sensor signals from the first sensor device 15.1 in such a way that, on the basis of the sensor signals of the first sensor device 15.1, process forces and/or process torques are recorded when, by moving the robot hand guide device connected to a tool flange 8 of the robot arm 2 with its third connection flange 14.2, the robot hand guide device 17 is moved together with the robot arm 2, and a tool 11 connected to the second connection flange 14.2 of the robot hand guide device 17 is handled as a result.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A robot hand guide device, comprising:
    a first connection flange configured to connect the robot hand guide device to a tool flange of a robot arm;
    a second connection flange configured to fasten a tool to be handled by the robot arm to the robot hand guide device;
    a first transfer apparatus configured to transfer forces and torques between the first connection flange and the second connection flange;
    a first sensor device attached to the first transfer apparatus, the first sensor device configured to detect the forces and torques transferred via the first transfer apparatus; and
    at least one first connection means coupled with the first connection flange and configured for detachably connecting a guide handle of the robot hand guide device to the first connection flange.

2. The robot hand guide device of claim 1, further comprising:
    at least one second connection means connected to the second connection flange;
    the at least one first connection means and the at least one second connection means configured for selectively detachably connecting the guide handle to the first connection flange or the second connection flange, respectively.

3. The robot hand guide device of claim 2, wherein the first connection means and the second connection means each comprise a mechanical coupling device configured for mechanically connecting the guide handle with the first connection flange or the second connection flange, respectively, in at least one of a force-fitting or form-fitting manner.

4. The robot hand guide device of claim 3, wherein the respective mechanical coupling devices of the first and second connection means comprise a mechanical safety device configured to allow operation of the guide handle exclusively on the respective first connection means or the second connection means.

5. The robot hand guide device of claim 2, wherein the first connection means and the second connection means each comprise an electrical contact means configured to electrically connect at least one of an enabling switch, a confirmation switch, or an emergency stop switch of the guide handle to an electric control device when the guide handle is mechanically coupled with the respective first connection flange or second connection flange.

6. The robot hand guide device of claim 5, further comprising:
    a safety control device configured to allow operation of the guide handle via the respective electrical contact means, exclusively, when the safety control device is either mechanically coupled to the first connection means or mechanically coupled to the second connection means.

7. The robot hand guide device of claim 6, wherein at least one of the electric control device, the safety control device, or an electronic evaluation unit for the first sensor device is accommodated in at least one of the guide handle or in the robot hand guide device.

8. The robot hand guide device of claim 1, further comprising:
    a first circumferential outer wall coupled with the first connection flange; and
    a plurality of first connection means arranged across the first circumferential outer wall.

9. The robot hand guide device of claim 1, further comprising:
    a second circumferential outer wall coupled with the second connection flange; and
    a plurality of second connection means arranged across the circumferential outer wall.

10. The robot hand guide device of claim 1, wherein the first connection flange comprises a first electrical contact group that is formed when the robot hand guide device is mechanically coupled with the tool flange of the robot arm to make electrical contact with a first mating contact group on the tool flange of the robot arm, thereby electrically connecting the robot arm with at least one of:
    an enabling switch of the guide handle,
    a confirmation switch of the guide handle,
    an emergency stop switch of the guide handle, or
    the first sensor device.

11. The robot hand guide device of claim 1, wherein the second connection flange comprises a second electrical contact group configured to make electrical contact with a second mating contact group on the tool when the tool is mechanically coupled with the second connection flange to thereby electrically connect the tool with at least one of the robot hand guide device or the robot arm.

12. The robot hand guide device according to claim 1, further comprising:
    an at least substantially cylindrical housing with an at least substantially circular cylindrical outer wall;
    wherein one circular end face of the housing is formed by the first connection flange and an opposite circular end face of the housing is formed by the second connection flange.

13. The robot hand guide device of claim 1, further comprising:
    a control device configured to evaluate sensor signals of the first sensor device such that, when the guide handle is connected to the first connection means, at least one of process forces or process torques are detected on the basis of the sensor signals in response to movement of the guide handle to move the robot hand guide device together with the robot arm, to which the robot hand guide device is connected by the first connection flange coupled with the tool flange of the robot arm, whereby a tool connected to the second connection flange of the robot hand guide device is handled as a result.

14. The robot hand guide of claim 1, further comprising:
    a control device configured to evaluate sensor signals of the first sensor device when the guide handle is connected to the second connection means of the second connection flange in such a way that, based on the sensor signals of the first sensor device, the robot arm is controlled in its link movements in a manual operation in response to moving the guide handle such that the robot hand guide device connected by the first connection flange to the tool flange of the robot arm is moved together with the robot arm.

15. The robot hand guide device of claim 1, further comprising:
    a third connection flange;
    a second transfer apparatus arranged between the first connection flange and the third connection flange; and
    a second sensor device attached to the second transfer apparatus, the second sensor device configured to detect forces and torques transferred via the second transfer apparatus.

16. The robot hand guide device of claim 15, further comprising:
    a control device configured to:
        evaluate sensor signals of the second sensor device when the guide handle is connected to the first connection means of the first connection flange in such a way that, based on the sensor signals of the second sensor device, the robot arm is controlled in its link movements in a manual operation; and
        evaluate sensor signals of the first sensor device such that, when the guide handle is connected to the first connection means of the first connection flange, at least one of process forces or process torques are detected on the basis of the sensor signals of the first sensor device in response to movement of the guide handle to move the robot hand guide device together with the robot arm, to which the robot hand guide device is connected by the first connection flange coupled with the tool flange of the robot arm, whereby a tool connected to the second connection flange of the robot hand guide device is handled as a result.

* * * * *